United States Patent [19]

Mincher et al.

[11] Patent Number: 5,408,506
[45] Date of Patent: Apr. 18, 1995

[54] DISTRIBUTED TIME SYNCHRONIZATION SYSTEM AND METHOD

[75] Inventors: Richard W. Mincher, San Jose; Kerry E. Lynn, Redwood City, both of Calif.

[73] Assignee: Apple Computer, Inc., Cupertino, Calif.

[21] Appl. No.: 89,431

[22] Filed: Jul. 9, 1993

[51] Int. Cl.6 .............................. H04L 7/00; H04J 3/06
[52] U.S. Cl. ..................................... 375/356; 375/357; 370/100.1; 370/103
[58] Field of Search ...................... 370/100.1, 103, 105; 375/107, 108; 455/52.1, 51.2

[56] References Cited

U.S. PATENT DOCUMENTS

| | | | |
|---|---|---|---|
| 4,598,413 | 7/1986 | Szechenyi | 370/105 |
| 4,736,393 | 4/1988 | Grimes | 375/107 |
| 4,815,110 | 3/1989 | Benson | 370/103 |
| 4,866,606 | 9/1989 | Kopetz | 364/200 |
| 4,926,446 | 5/1990 | Grover | 375/109 |
| 5,001,730 | 3/1991 | Franaszek | 370/105 |
| 5,027,375 | 6/1991 | Ernst | 375/107 |
| 5,200,957 | 4/1993 | Dahlin | 370/100.1 |

FOREIGN PATENT DOCUMENTS

| | | |
|---|---|---|
| 0523362 | 3/1992 | European Pat. Off. . |
| 9107030 | 5/1991 | WIPO . |

OTHER PUBLICATIONS

Riccardo Gusella and Stefano Zatti, "The Accuracy of the Clock Synchronization Achieved by TEMPO in Berkeley UNIX 4.3BSD," *IEEE Transactions On Software Engineer*, vol. 15, No. 7, Jul. 1989, pp. 847-853.
David R. Cheriton, "A Multicast-based Clock Synchronization Algorithm," Computer Science Department, Stanford University, May 13, 1987, p. 1-6.

*Primary Examiner*—Edward L. Coles, Sr.
*Assistant Examiner*—John Ning
*Attorney, Agent, or Firm*—Greg T. Sueoka

[57] ABSTRACT

A distributed time synchronization system and method synchronizes nodes within a frequency hopping spread spectrum (FHSS) local area network (LAN) group to a virtual master clock value. Each node system of the present invention comprises a CPU, an input device, a display device, a printer or hard copy device, a given amount of RAM and ROM memory, a data storage device, a local clock, a transmitter/receiver, an antenna, a virtual master clock processor, and a common data bus. The method of the present invention comprises the inclusion of a node's local clock value in a message just prior to transmission over the network, storage of a node's local clock value in RAM after an incoming message has been received, and the calculation of the time delay between the sending node and the receiving node by the virtual master clock processor. The virtual master clock processor utilizes this time delay in maintaining a virtual master clock value, which it uses in adjusting the value of the node's local clock at periodic intervals. This synchronizes the receiving node to the virtual master clock value. If the magnitude of the time delay exceeds a maximum allowed value, the magnitude is clamped to the maximum allowed value, thereby maintaining synchronization within a predetermined tolerance. A node can receive a message transmitted over the FHSS LAN regardless of the message address. Synchronization is therefore maintained without requiring a node to be able to communicate with any specific node within the FHSS LAN group.

19 Claims, 9 Drawing Sheets

DISTRIBUTED TIME SYNCHRONIZATION SYSTEM AND METHOD

BACKGROUND OF THE INVENTION

1. Field of the Invention

The present invention relates generally to local area networks (LAN), and more particularly, to a system and method for ensuring time synchronization between two or more computer systems communicating via a wireless LAN. Still more particularly, the present invention relates to a distributed time synchronization system and method for a frequency hopping spread spectrum LAN, which utilizes a plurality of logical frequency channels within a frequency band for communication.

2. Description of the Background Art

A wireless LAN system does not have any hardwired couplings between nodes. This allows nodes to easily join and exit a given LAN, and eliminates the need for routing LAN cabling to each node site. Communication between nodes in a wireless LAN is accomplished by transferring information using electromagnetic signals having a specified frequency range. Such a frequency range has a finite bandwidth, which limits the amount of information that can be transferred. In situations having many nodes or groups of nodes utilizing the same frequency range, bandwidth limitations severely restrict the efficient transfer of information. Spread spectrum (SS) communication techniques have been used to improve bandwidth availability in situations involving many communicating systems. One such spread spectrum technique is known as frequency hopping spread spectrum (FHSS). In a FHSS LAN, communication between nodes is accomplished by transferring information using electromagnetic signals within a plurality of logical frequency channels spanning a frequency band. Each logical frequency channel comprises one or more physical frequency channels, with each physical frequency channel having a designated bandwidth. In a FHSS LAN, information is preferably transmitted sequentially and redundantly on each physical frequency channel within a logical frequency channel, thereby making the logical frequency channel bandwidth the same as that of any single physical frequency channel. A group of nodes communicating in a FHSS LAN utilize one logical frequency channel within the frequency band for a designated amount of time. After the designated amount of time, all the nodes in the group must move to a new logical frequency channel within the frequency band, hence the term frequency hopping spread spectrum. Since nodes within a given group transfer information on a specific logical frequency channel only for a limited time, that channel's bandwidth becomes available after the group's frequency hop. Another group of nodes may then communicate on this logical frequency channel for the designated amount of time. Since each node within a group is required to move to a new logical frequency channel at a prescribed time, the importance of synchronization between each node's clock becomes apparent.

Any logical frequency channel within a band can be subject to interference or noise; thus, moving to a new logical frequency channel also aids in improving signal reception if such effects are present within a portion of the frequency band. FCC regulations are structured in a manner which reflects these considerations, and have mandated specific FHSS rules for frequency bands at 900 and 2400 MHz.

Within a single FHSS LAN group, the lack of perfect synchronization between nodes requires the use of a "dead-time" interval that includes time periods before and after a frequency hop. During this dead time, no information is transmitted by any of the nodes. Providing such dead time ensures that all nodes have completed all sending and receiving of information prior to a frequency hop, and that all nodes have moved to the new channel and are ready to communicate again after the frequency hop, before transmission of information begins. Thus, time synchronization between the clocks of each node included within a FHSS LAN group is essential in order to minimize the dead-time, and thereby maximize the time available for sending and receiving information.

In the prior art, many have attempted to solve LAN time synchronization problems by designating one or more nodes as masters. In a single-master LAN, one node is designated as the master node and the clock of the designated node is utilized as the timing standard for every other node connected to the network. This requires the master node periodically send a special time synchronization message to all other nodes within the network. Thus, all nodes in a single-master system must be capable of receiving messages from the master.

On a FHSS LAN, and in general on any wireless LAN, electrical noise and interference, coupled with signal attenuation effects corresponding to node separation distances, signal path obstacles, or multipath fading arising from signal reflections preclude continuous reliable communication between a node and another specified node. It is therefore desirable to maintain a wireless LAN environment in which a node is considered to be a member of a designated wireless LAN group if it can communicate with at least one other node within the group. Since each node within a single-master LAN system must be able to communicate with the master node, a single-master LAN system does not allow the flexibility desired in a wireless LAN environment.

If, within a single-master LAN system, the master's clock fails, or if the node serving as the master leaves the network, provisions must exist for the removal of the current master, and for the selection of another node as a new master. Other nodes within the LAN require a certain amount of time in order to determine if communication with the master node cannot take place. Time is also required to select a new master node. Thus, in this situation the nodes have no synchronization source until a new master is selected. This is undesirable in any type of LAN since this increases the likelihood that synchronization cannot be maintained between nodes. Particularly in the case of a FHSS LAN, close synchronization must be maintained in order to maximize the amount of time available for information transfer between nodes prior to moving to a new logical frequency channel. Moreover, close synchronization helps to minimize any drift away from a synchronized state in the event that one or more nodes cannot communicate within the FHSS LAN for a limited time.

Another problem associated with single-master LAN systems pertains to the master node recovering from a temporary communication problem. If a new master node has been selected during a time interval in which the original master node could not communicate, the LAN will have two master nodes after the original master node's recovery. Synchronization differences between the two master nodes results in conflicting synchronization messages being sent over the LAN. This situation is obviously undesirable on a FHSS LAN, since conflicting synchronization messages would cause nodes to move to a new logical frequency channel at different times.

In general, if information is being transferred on a LAN, a node wishing to send a message to another node must wait until the current information transfer has been completed before the message can be sent. In like manner, a node within a FHSS LAN is able to transmit information to other nodes only when the current frequency channel is not being used for information transmission by another node. On a FHSS LAN, the information transfer capacity of any given logical frequency channel is limited by the logical frequency channel bandwidth, and by the limited amount of time the nodes in a LAN group remain on the channel. The limited information transfer capacity on any given channel dramatically increases the importance of minimizing unnecessary information transfers. A FHSS LAN must therefore minimize the number of information transfers pertaining to LAN maintenance, thereby maximizing the amount of time available for other information transfer. The presence of special time synchronization messages and master-related LAN maintenance messages on a single-master LAN would adversely affect the performance of a FHSS LAN, and are therefore not suitable for use in such a system. Node synchronization on a FHSS LAN must be achieved without such messages in order to maximize communication efficiency.

In a multiple-master LAN, two or more nodes serve as masters for time synchronization purposes. Nodes within this type of LAN collect synchronization messages from each master at regular intervals, and typically calculate a corresponding average correct time. This requires each node to have the capability to communicate with at least one master node. As discussed above, in a wireless LAN environment reliable communication between two specific nodes is not always possible. As a result, a multiple-master system cannot be used as the basis for a FHSS LAN.

As in the case of a single-master LAN, a multiple-master LAN must have provisions for the selection and removal of masters. Such provisions would greatly increase the message traffic on a wireless LAN, adversely affecting communication efficiency as discussed for the single-master LAN.

On the multiple-master LAN, if the difference between a node's current clock value and the calculated average obtained from master node clock values is within a predetermined tolerance, the node can update its clock by setting its clock to be the same as the average. If the tolerance limit is exceeded, the node sends an argument message comprising its clock value to all other nodes within the LAN. After receiving the argument message, each of the other nodes treats the argument message as a synchronization request message, and in turn send their clock values to the node which originally sent the argument message. This node then calculates a new average clock value for use in updating its clock. The number of messages transferred during the argument procedure can become quite large, flooding a FHSS LAN with messages and consuming a channel's information capacity. Synchronization discrepancies between each node's clock and the degradation of network performance because of flooding makes such prior art methods undesirable in a wireless LAN context.

Thus, both single-master and multiple-master systems are incapable of providing an adequate solution to time synchronization issues on FHSS LANs. Therefore, there is a need for a system and method for ensuring time synchronization between nodes on a FHSS LAN that maintains synchronization without the use of one or more master nodes; requires no special messages dedicated to time synchronization, arguments, or master-related LAN maintenance; and functions in an incompletely connected environment.

SUMMARY OF THE INVENTION

The present invention is a distributed time synchronization system and method for a FHSS LAN. The synchronization system automatically achieves synchronization of each node's clock using a unique message format that includes clock synchronization information. In addition, nodes maintain clock synchronization in an incompletely connected environment.

The system of the present invention functions in a wireless LAN comprising two or more nodes. Each node is able to transmit information to and receive information from at least one other node through frequency hopping spread spectrum communication. Each node system of the present invention comprises a CPU; an input device; a display device; a printer or other device for producing hard copy of information; random-access memory (RAM); read-only memory (ROM); a data storage device; a local clock; a transmitter/receiver that facilitates wireless frequency hopping spread spectrum communication with other nodes; an antenna; and a virtual master clock processor. With the exception of the antenna, which is coupled to the transmitter/receiver, all elements within a node are coupled to a common data pathway in a Von Neumann architecture. The random access memory further comprises an operating system, an application program, and routines related to transmitting and receiving messages over the wireless network. The virtual master clock processor comprises a means for extracting and processing time information contained within messages received from other nodes, a means for periodically maintaining node synchronization to a virtual master clock value derived from the processed time information.

The method of the present invention preferably incorporates time information into all messages transferred between nodes. A node incorporates the value of its local clock into a message just prior to sending the message. A node is capable of receiving any message transmitted from other nodes within a predetermined receiving distance, regardless of whether or not the data in the message is addressed to the node. Therefore, a given node can obtain time information for synchronization purposes even if it was not the intended recipient of the message data. Upon message receipt, the receiving node stores the message header and the value of its local clock. The receiving node's virtual master clock processor then uses the time information contained within the message to calculate the time difference between the sending node's local clock and its local clock value at message receipt. Prior to frequency hopping to another channel, a node's virtual master clock processor averages the time differences calculated from all messages the node has received since the previous frequency hop, thereby creating a virtual master clock value corresponding to the average of the local clock values for all nodes from which messages were received. The virtual master clock processor then uses this average to adjust the node's local clock value, thereby maintaining synchronization with the other nodes prior to the change in the operating frequency of the network. If the magnitude of any time difference calculated by the virtual master clock processor is larger than a maximum allowed value, the time difference is clamped to the maximum allowed value. This ensures system stability by preventing an erroneous clock value from greatly affecting synchronization, and allows synchronization to the virtual master clock value to be maintained within a predetermined tolerance.

If a node has not received any messages during an interval between frequency hops, the virtual processor initiates a general broadcast of a synchronization request message. Nodes which receive the synchronization request message respond by transmitting a message over the network. This message can then be used by all nodes for synchronization.

DETAILED DESCRIPTION OF THE PREFERRED EMBODIMENTS

Figure 1:
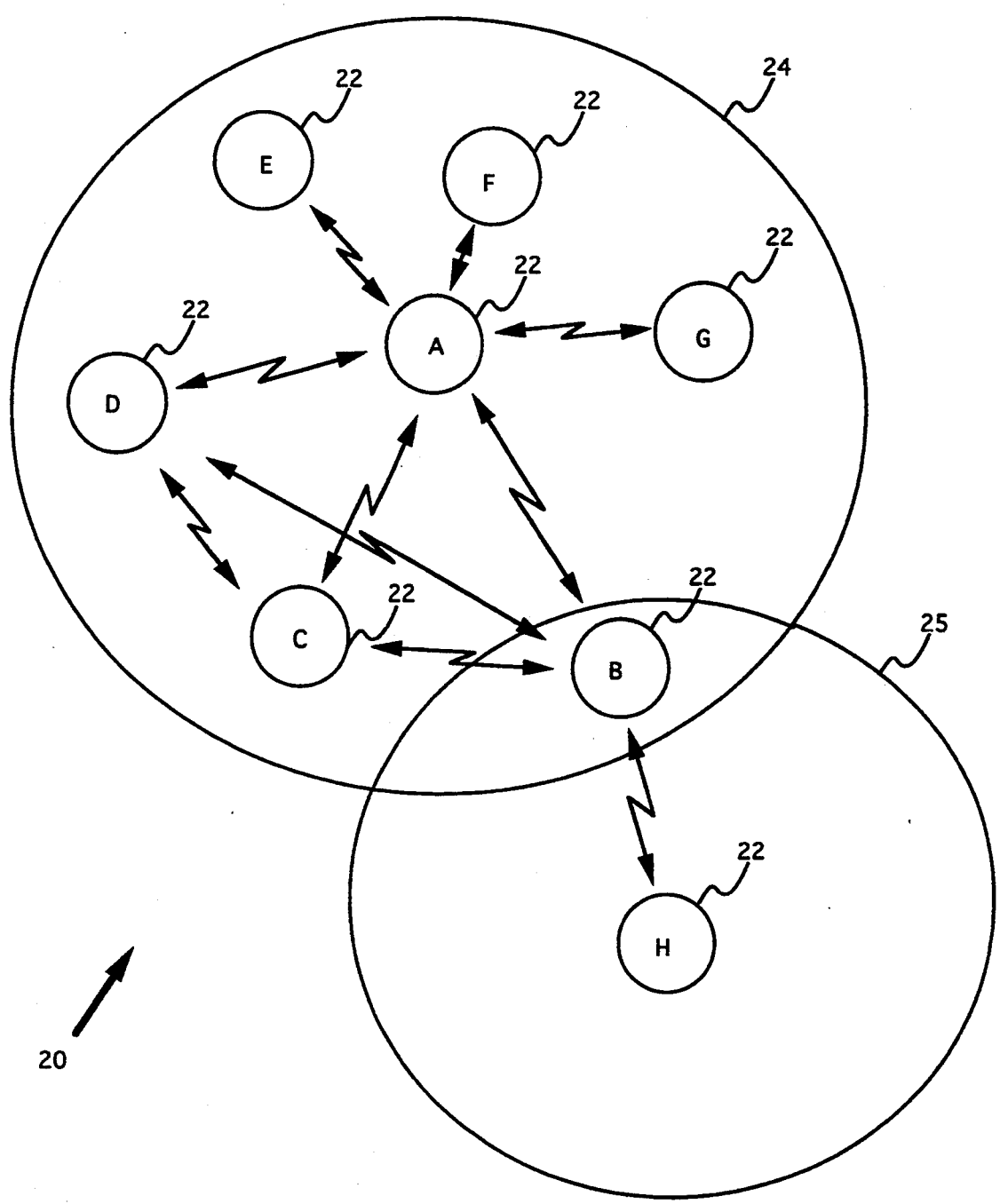
FIG. 1 shows a prior art system of nodes communicating in a wireless LAN, in which one node lies outside the communication range of all but one other node.

FIG. 1 shows an exemplary prior art wireless LAN 20 configuration in which the present invention may operate. The wireless LAN 20 comprises two or more nodes 22 transmitting and receiving information without the use of hardwired couplings between the nodes 22. Information transmitted in a wireless LAN 20 is subject to signal attenuation effects due to node separation distances, signal path obstacles, and multipath fading caused by signal reflections. Therefore, one or more nodes 22 within the wireless LAN 20 may not be capable of receiving information sent from another node 22. Such a LAN configuration is defined as having incomplete connectivity. In a wireless LAN 20 having incomplete connectivity, one or more communication boundaries 24 can be defined to indicate which nodes 22 within the wireless LAN 20 can reliably communicate with each other. In FIG. 1, one communication boundary 24 encloses nodes A through G, while another communication boundary 25 encloses nodes B and H. Thus, nodes A through G can all communicate reliably with each other, while node H can communicate reliably only with node B. Information directed to node H must therefore either originate from node B or pass through node B. In addition to attenuation effects, wireless LAN 20 signals are subject to noise and interference. Two or more nodes 22 intentionally communicating on the wireless LAN 20 comprise a wireless LAN group.

Figure 2:
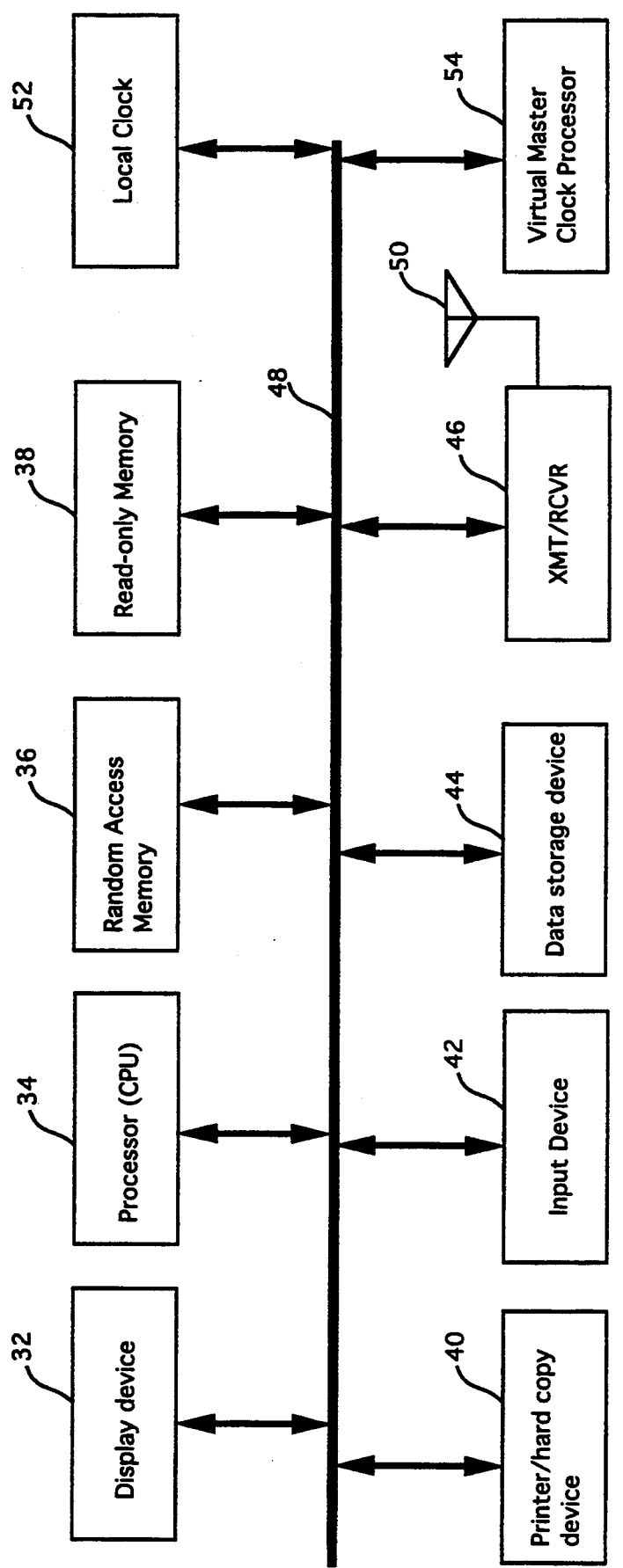
FIG. 2 shows a preferred embodiment of the distributed time synchronization system within a node computer system.

Each node 22 within the wireless LAN 20 maintains the distributed time synchronization system of the present invention, which in a preferred embodiment comprises a computer system 30 having an architecture illustrated in the block diagram of FIG. 2. The computer system 30 preferably comprises a display device 32, a CPU 34, a given amount of random access memory (RAM) 36, a given amount of read-only memory (ROM) 38, a printer or hard copy device 40, an input device 42, a data storage device 44, a transmitter/receiver 46, a common data pathway or bus 48, an antenna 50, a local clock 52, and a virtual master clock processor 54. With the exception of the antenna 50, all elements of the computer system 30 in the preferred embodiment are coupled to the common data bus 48 in a Von Neumann architecture. The antenna 50 is coupled to the transmitter/receiver 46.

The routines of the present invention for logical frequency channel selection, processing related to information transmission and reception as well as an operating system and application programs are preferably stored in RAM 36 and ROM 38 memory. The routines include a routine for sending information over the network, and a routine for extracting time synchronization information from messages received. Messages received are routed directly into RAM 36 by the transmitter/receiver 46 beginning at a predetermined RAM 36 address, in a direct memory access (DMA) information transfer. The present invention preferably uses a conventional operating system 28 such as Macintosh System Software version 7.1, DOS or Windows. The RAM 36 may also include a variety of different application programs including but not limited to computer drawing programs, word processing programs, and spreadsheet programs.

Each node's local clock 52 comprises a programmable counting or time keeping means, and is preferably implemented as a programmable counter coupled to a crystal oscillator. In an exemplary embodiment, the local clock 52 may be integrated with the CPU 34 such as with many present-day microprocessors. The local clock 52 serves as the node's time reference for frequency hopping. The virtual master clock processor 54 comprises an adjustment timer which maintains a time count for indicating when the local clock is to be adjusted and when frequency hopping is to occur, a plurality of buffers, and control circuitry. The virtual master clock processor 54 extracts time information contained within messages received, and utilizes this information to maintain a virtual master clock value. At periodic intervals indicated by the adjustment timer, the virtual master clock processor 54 adjusts the local clock value relative to the virtual master clock value in order to maintain synchronization to other nodes 22 within the wireless LAN 20.

For message transmission, the CPU 34 organizes information to be sent to one or more other nodes 22 within the wireless LAN 20 into a specific message structure, and informs the transmitter/receiver 46 as to the location of the message in RAM 36. The transmitter/receiver 46 senses the wireless LAN 20 for network activity, and informs the CPU 34 if the network 20 is busy or available. When the network 20 is available, the CPU 34 incorporates the value of the local clock 52 into the header of the message, and directs the transmitter/receiver 46 to send the message. The transmitter/receiver 46 then transmits the message over the network 20 via its antenna 50.

The transmitter/receiver 46 operates in a receive mode unless it is directed to transmit a message by the CPU 34. While in receive mode, the transmitter/receiver 46 receives messages sent by other nodes within receiving distance. A node can receive any message on the current channel, even if the data contained in a message is addressed to another node. A message is received by the transmitter/receiver 46 via its antenna 50. The transmitter/receiver 46 maintains the starting address of a portion of available RAM 36, and routes the incoming message into RAM 36 through DMA beginning at this address. In the preferred embodiment of the distributed time synchronization system, the CPU 34 stores the receiving node's current local clock value in RAM 36 immediately after the entire message has been stored in RAM 36. At this point, the virtual master clock processor 54 can access the time information contained within the message and the stored local clock value of the receiving node 22 in order to maintain the virtual master clock value. After message reception, the receiving node's CPU 34 determines which node the message was directed to, and whether any further actions, such as transmission of a response message, are required. In an alternate embodiment, the CPU 34 could store the current local clock value after the message header were stored rather than after-the entire message had been stored. This would allow the CPU 34 to analyze the message header and determine if actions are required without waiting for storage of the entire message.

In the preferred embodiment of the distributed time synchronization system 30, the transmitter/receiver 46 follows a logical frequency channel selection sequence under the direction of the CPU 34, thereby providing for wireless frequency hopping spread spectrum communication between nodes 22. Each logical frequency channel in the preferred embodiment comprises five physical frequency channels, each physical frequency channel a designated bandwidth. In a FHSS LAN, information is preferably transmitted sequentially and redundantly on each physical frequency channel within a logical frequency channel, thereby making the logical frequency channel bandwidth the same as that of any single physical frequency channel. As a result of the logical frequency channel selection by the CPU 34, all nodes 22 within a given wireless LAN group communicate on a single logical frequency channel within a specified frequency band for a designated amount of time, and subsequently move to a new logical frequency channel within the band. Communication then continues on this logical frequency channel for a specified amount of time, after which another new logical frequency channel is selected, and so on. In the preferred embodiment, a node 22 operates on a physical frequency channel for 400 ms. Since each logical frequency channel in the preferred embodiment comprises five physical frequency channels, the total amount of time a node remains on a logical frequency channel is 2 seconds. Thus, a frequency hop occurs every two seconds in this case.

The distributed time synchronization system is implemented using an Apple computer system in an exemplary embodiment. In the exemplary embodiment, the frequency band has a bandwidth of 2.4 GHz, and each physical frequency channel within the frequency band has a bandwidth of 1 MHz. FCC regulations require a minimum of seventy-five and a maximum of eighty-three separate physical frequency channels within the frequency band.

Figure 3:
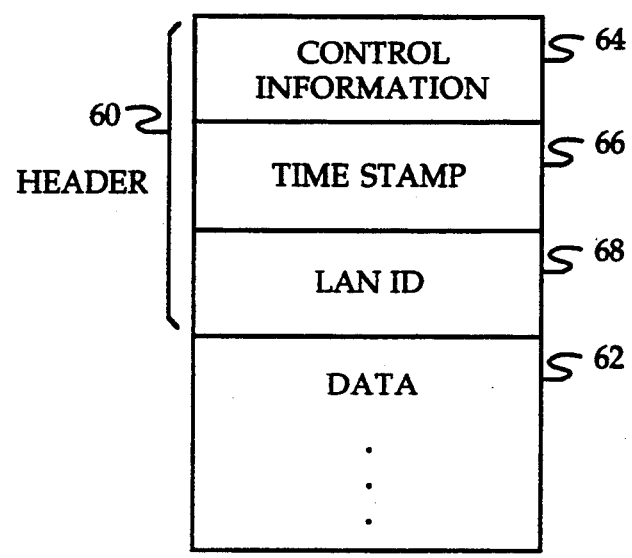
FIG. 3 shows a preferred embodiment for the structure of a message.

All messages transferred between nodes 22 preferably comprise a header portion 60 and a data portion 62, as shown in FIG. 3. The header portion 60 comprises a control information portion 64, a time stamp portion 66, and a LAN ID portion 68. The control information portion 64 indicates the message type and any control functions to which the message may correspond. The time stamp portion 66 comprises the sending node's 22 local clock value just prior to transmission of the message. The LAN ID portion 68 indicates to which wireless LAN group or groups the message is directed. The data portion 62 comprises an address indicating the specific node or node portion to which the message is addressed, and the information which the sending node 22 intends to convey to the receiving node 22.

Figure 4:
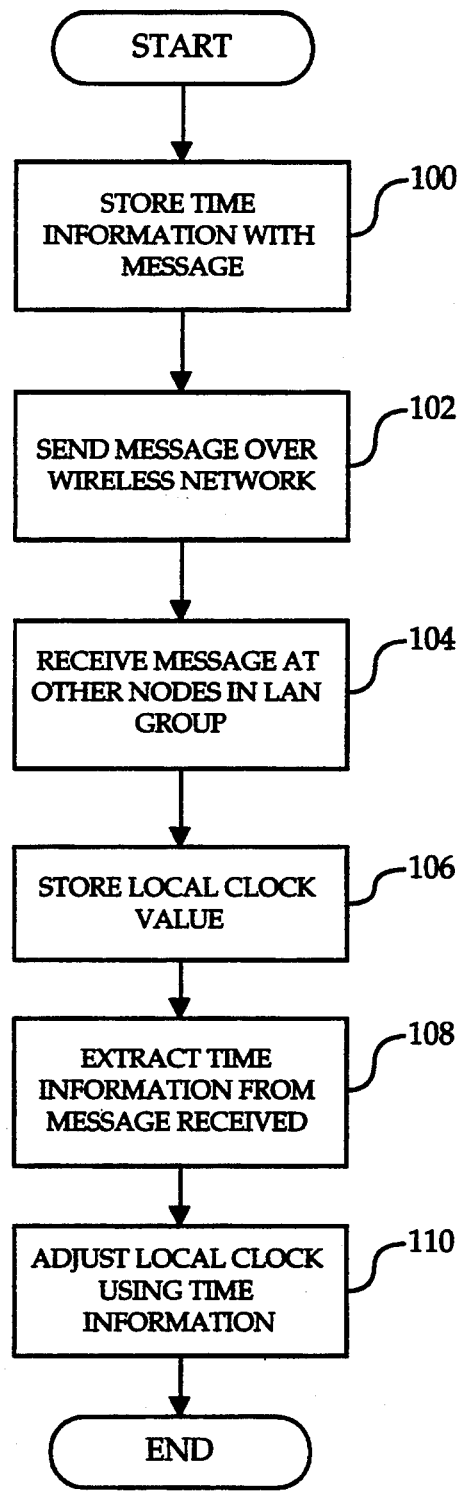
FIG. 4 is a flowchart showing an overview of the distributed time synchronization method of the present invention.

The flowchart of FIG. 4 provides an overview of the operation of the preferred method of the present invention. The preferred method begins in step 100 with the CPU 34 of a node 22 that intends to send a message storing time information in the message just prior to transmission on the wireless LAN 20. After the time information has been incorporated into the message, the transmitter/receiver 46 of the sending node 22 transmits the message through use of the antenna 50 in step 102. In step 104, the message is received by other nodes' transmitters/receivers 46 via their antennas 50, after which the CPUs 34 of the receiving nodes 22 store the value of their respective local clocks 52 in RAM 36 in step 106. Additional messages may also be received and processed, although only one message receipt is necessary for synchronization. The virtual master clock processor 54 of each receiving node 22 extracts the time information contained within each message in step 108, and compares the extracted time to the time the message was received. In step 110, the virtual master clock processor 54 of each receiving node 22 adjusts its respective local clock value relative to the time information extracted from each received message, thereby synchronizing the node 22 with the virtual master clock.

Figure 5:
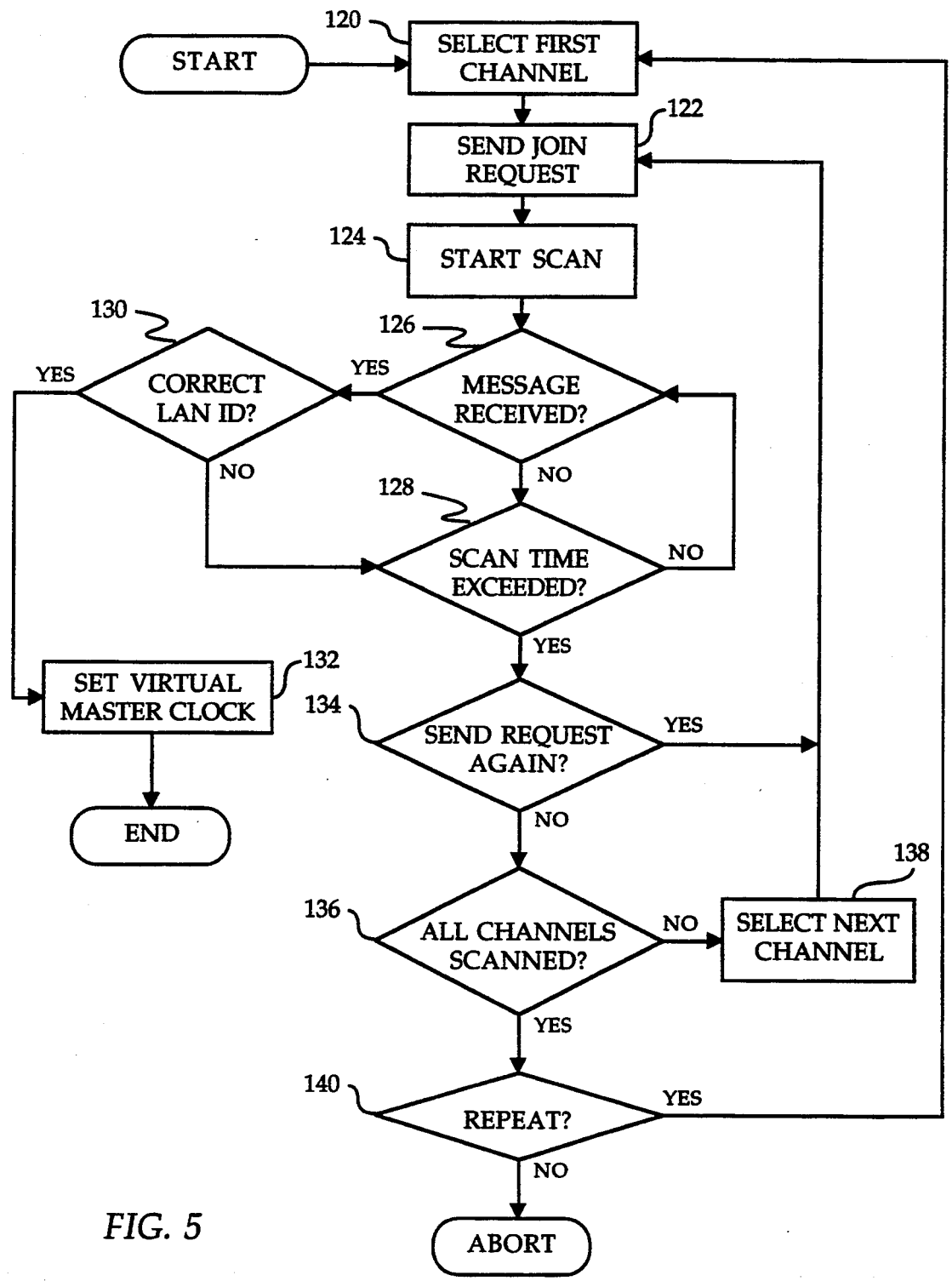
FIG. 5 is a flowchart of a preferred method for a node joining an existing wireless LAN group.

FIG. 5 shows the preferred method for a new node 22 to join an existing wireless LAN group. The process begins in step 120 with a node 22 that wishes to join a specific wireless LAN group selecting the lowest logical frequency channel within the frequency band. Next, in step 122, the joining node's CPU 34 instructs the transmitter/receiver 46 to transmit a join request message over the network. This message contains a special code within its time stamp portion 66, which prevents other nodes 22 from using the message for synchronization purposes. This ensures that the local clock 52 value on the node 22 attempting to join the wireless LAN group does not affect the group's synchronization.

Nodes 22 which receive the join request message will transmit a response message that the joining node 22 can utilize for synchronization purposes. After the joining node 22 has sent the join request message in step 122, it begins a scan of the logical frequency channel in step 124. During the scan, the transmitter/receiver 46 will receive messages sent from other nodes 22 within receiving distance in an attempt to find the desired FHSS LAN group. Since any given FHSS LAN group hops from one operating frequency to another after a designated amount of time, channels must be scanned rapidly in order to increase the probability that a node 22 can join the desired LAN group while the group is on a known logical frequency channel. In step 126, the CPU 34 determines if the transmitter/receiver 46 has received a message. If not, the CPU 34 checks whether the scan time has been exceeded in step 128. The join operation preferably uses a scan time that is approximately forty times faster than the frequency hopping rate. In the preferred embodiment, the scan time is therefore set to 50 ms. If the scan time has not been exceeded, operation loops back to step 126 with the CPU 34 checking for a received message.

If step 126 indicates that a message has been received, the CPU 34 determines if the LAN ID 68 portion of the received message corresponds to the desired FHSS LAN group in step 130. If not, the process returns to step 128 with the CPU 34 checking if the scan time has been exceeded. If the desired LAN group has been found in step 130, the virtual master clock processor sets the virtual master clock value of the joining node to the value contained with the time stamp 66 portion of the received message in step 132. This value indicates the amount of time remaining before the node 22 which sent the message moves to a new logical frequency channel. The join process has been successfully completed at this point. The virtual master clock processor 54 will subsequently use the virtual master clock value for adjusting the joining node's local clock 52 value.

If the CPU 34 determines that the scan time has been exceeded in step 128, it next determines if the join request message should be sent again in step 134. Multiple join request messages are preferably transmitted on each logical frequency channel in order to reduce the possibility that one or more join request messages were not received due to noise, interference, or signal attenuation effects. In the preferred embodiment, up to four join request messages are transmitted on each logical frequency channel. The 50 ms scan time available for receiving a reply to a join request message therefore gives a maximum time of 200 ms available on each logical frequency channel. Thus, the joining node 22 moves from one logical frequency channel to another at a rate ten times faster than the rate of a FHSS LAN group in the preferred embodiment. This ensures that a node wishing to join a given FHSS LAN group will find the group quickly if the group is communicating within the frequency band. If another join request message is to be transmitted, the process loops back to step 122 in order to do so.

If no further join request messages will be transmitted, the CPU 34 determines in step 136 if all logical frequency channels have been scanned. If one or more logical frequency channels have not been scanned, the CPU 34 selects the next logical frequency channel in step 138, after which operation loops to step 122 for transmittal of a join request message on this channel. If all logical frequency channels have been scanned in step 136, the CPU determines if the entire join process should be repeated in step 140. Repeated scans through all channels within the frequency band without finding the desired LAN group may indicate that the desired LAN group is not present. In the preferred embodiment, two scans are performed through all channels. If no more channels will be scanned, the join attempt is aborted.

Figure 6:
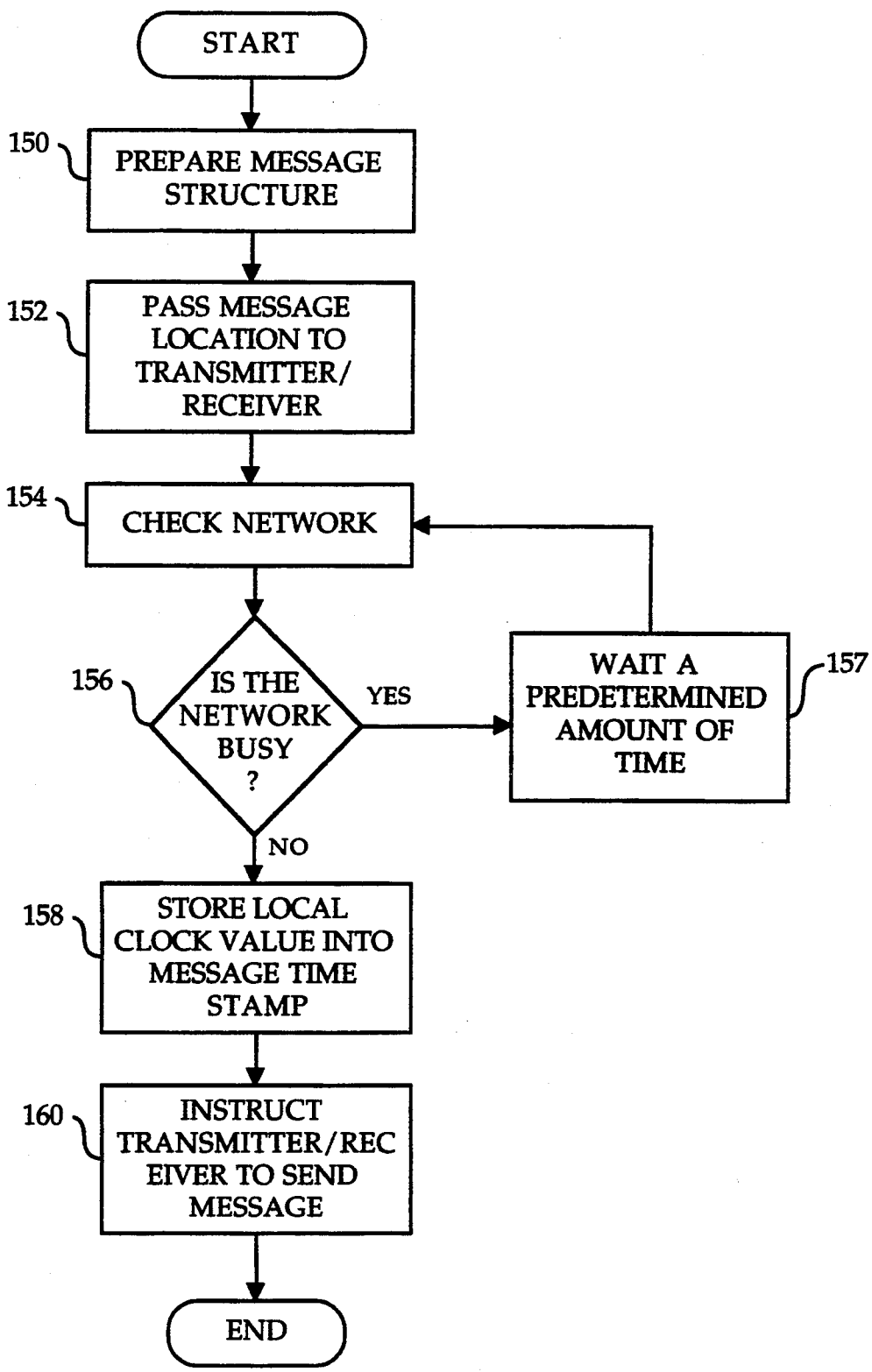
FIG. 6 is a flowchart showing the preferred method for sending messages.

FIG. 6 is a flowchart showing the preferred method for sending a message to one or more nodes 22 within a given wireless LAN group. As noted above, the present invention advantageously includes time synchronization information in every message transmitted over the network 20. In step 150, the CPU 34 prepares a message having the structure shown in FIG. 3, placing the appropriate information into the header portion 60 and the data portion 62. Next, in step 152, the CPU 34 informs the transmitter/receiver 46 of the message location in RAM 36. After step 152, the CPU 34 instructs the transmitter/receiver 46 to check the wireless LAN 20 for message traffic in step 154. The CPU 34 next determines if the transmitter/receiver 46 found the network 20 to be busy in step 156. A message cannot be sent while the network 20 is busy; therefore, a busy condition causes the CPU 34 to wait a predetermined amount of time in step 157. After waiting the predetermined amount of time, operation loops to step 154 with the transmitter/receiver 46 checking the network 20 for message traffic. If the transmitter/receiver 46 did not detect any network traffic in step 156, the CPU 34 stores the value of the local clock 52 into the message's time stamp 66 in step 158. In the case of a join message, the CPU 34 would set the message's time stamp 66 to a special value indicating that the time stamp is not to be used. The local clock 52 value stored in the message time stamp 66 indicates the time at which message transmission begins. Therefore, immediately after step 158, the CPU 34 instructs the transmitter/receiver 46 to send the message in step 160, which is broadcast over the network 20 via the antenna 50.

Figure 7:
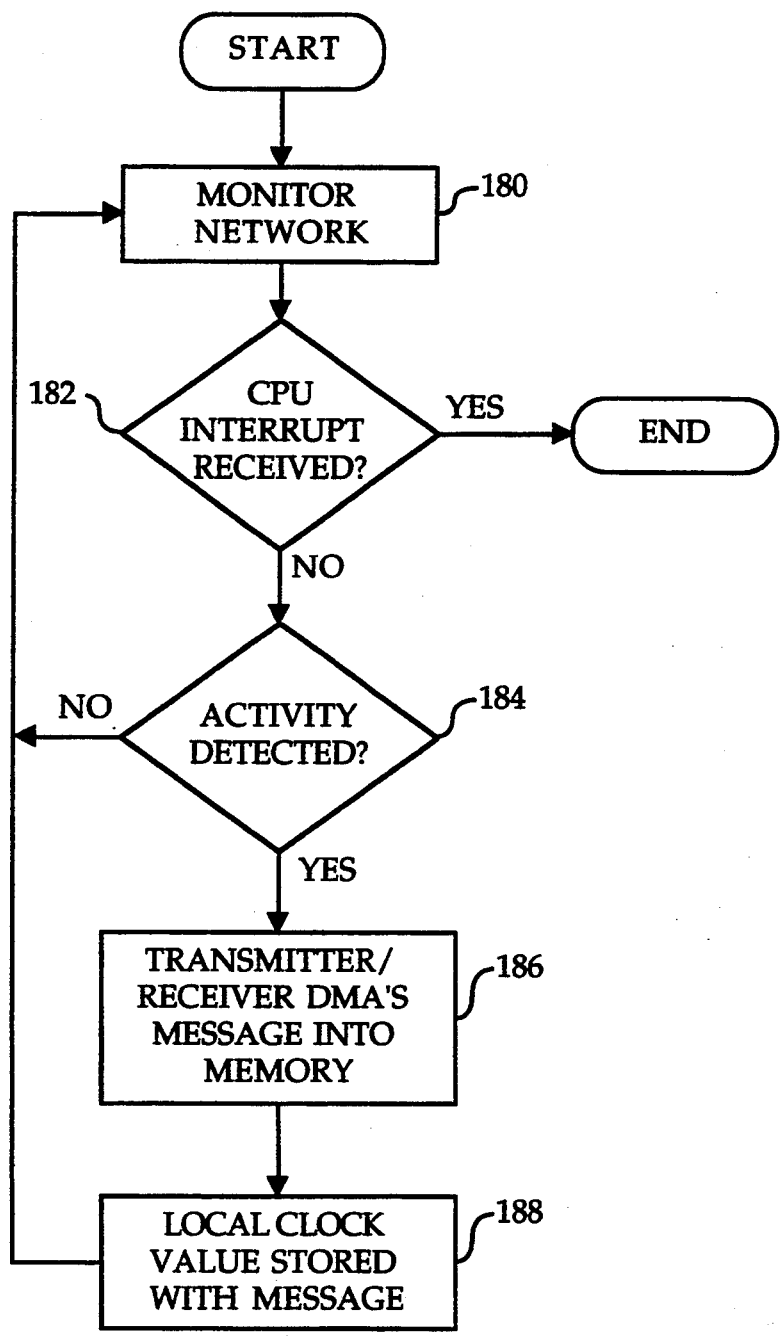
FIG. 7 is a flowchart depicting the preferred method for receiving messages.

The preferred method for receiving a message is shown in the flowchart of FIG. 7. The transmitter/receiver 46 preferably operates in a mode which allows message reception unless the CPU 34 requests message transmission. Beginning with step 180, the transmitter/receiver 46 monitors the network 20 for activity via its antenna 50. In step 182, the transmitter/receiver 46 determines if a CPU 34 interrupt requesting message transmission has occurred. If so, the receive process ends. The transmitter/receiver 46 next determines if message transfer activity is present on the network 20 in step 184. If no message transfer activity is occurring, the transmitter/receiver 46 continues to monitor the network 20 in step 180. Message transfer activity detected in step 184 causes the transmitter/receiver 46 to receive a message in step 186. The transmitter/receiver 46 transfers the incoming message into RAM 36 via direct memory access (DMA). The transmitter/receiver 46 sends a signal to the CPU 34 after the entire message has been stored in RAM 36. After receiving this signal, the CPU 34 stores the value of the local clock 52 in RAM 36 in step 188. Then the method returns to step 180 to operate in receive mode to accept additional messages transmitted over the network 20.

Figure 8:
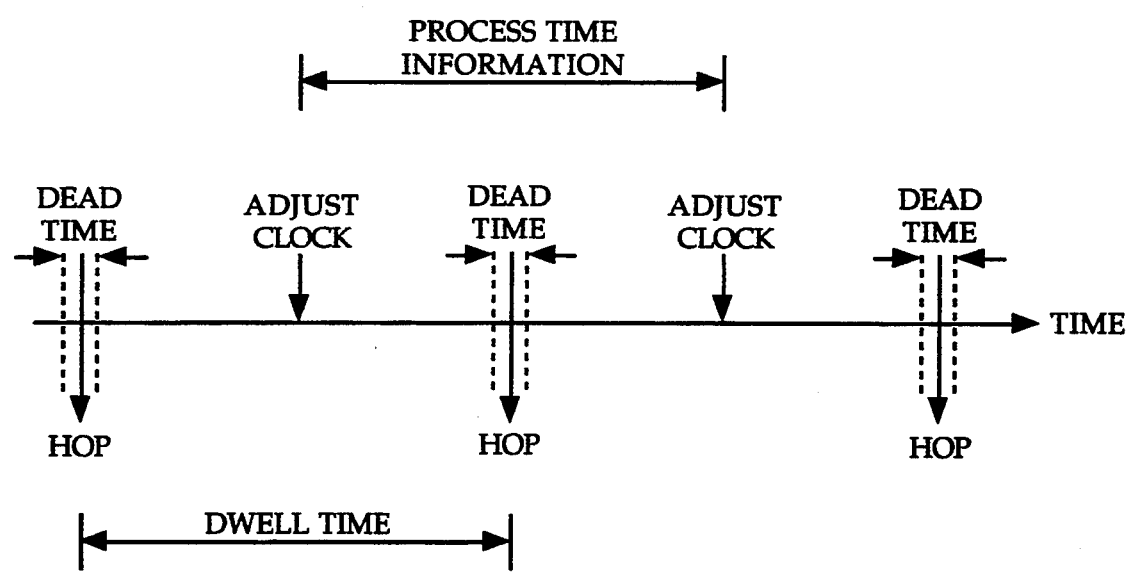
FIG. 8 is a timing diagram indicating the preferred timing between local clock adjustment and frequency hopping.

FIG. 8 shows the preferred timing relations between frequency hop timing and local clock 52 adjustment by the virtual master clock processor 54. The time interval during which a node utilizes a given channel is known as dwell time. At some point during the dwell time, a node's virtual master clock processor 54 must adjust the local clock to ensure the node maintains synchronization with other nodes in the wireless LAN group. Local clock adjustment time occurs at or approximately at the midpoint of the dwell time in the preferred embodiment of the present invention. Waiting until the midpoint of the dwell time increases the likelihood that the node has received messages since the previous local clock 52 adjustment, and provides the virtual master clock processor 54 with ample time to perform the local clock 52 adjustment prior to the upcoming frequency hop. The dashed lines in the figure correspond to a "dead time" that occurs before and after a frequency hop. During the dead time, no communication between nodes 22 can occur. Prior to a frequency hop, the dead time ensures that messages will not be transmitted while one or more nodes moves to a new frequency channel. The dead time after the frequency hop ensures that all nodes 22 within a wireless LAN group have moved to the new frequency, and are ready to communicate again. This prevents information transmitted from a sending node 22 and directed to one or more receiving nodes 22 from being lost due to a small lack of synchronization. Messages can be received and their time information collected and processed at any time other than during a dead time.

Figure 9:
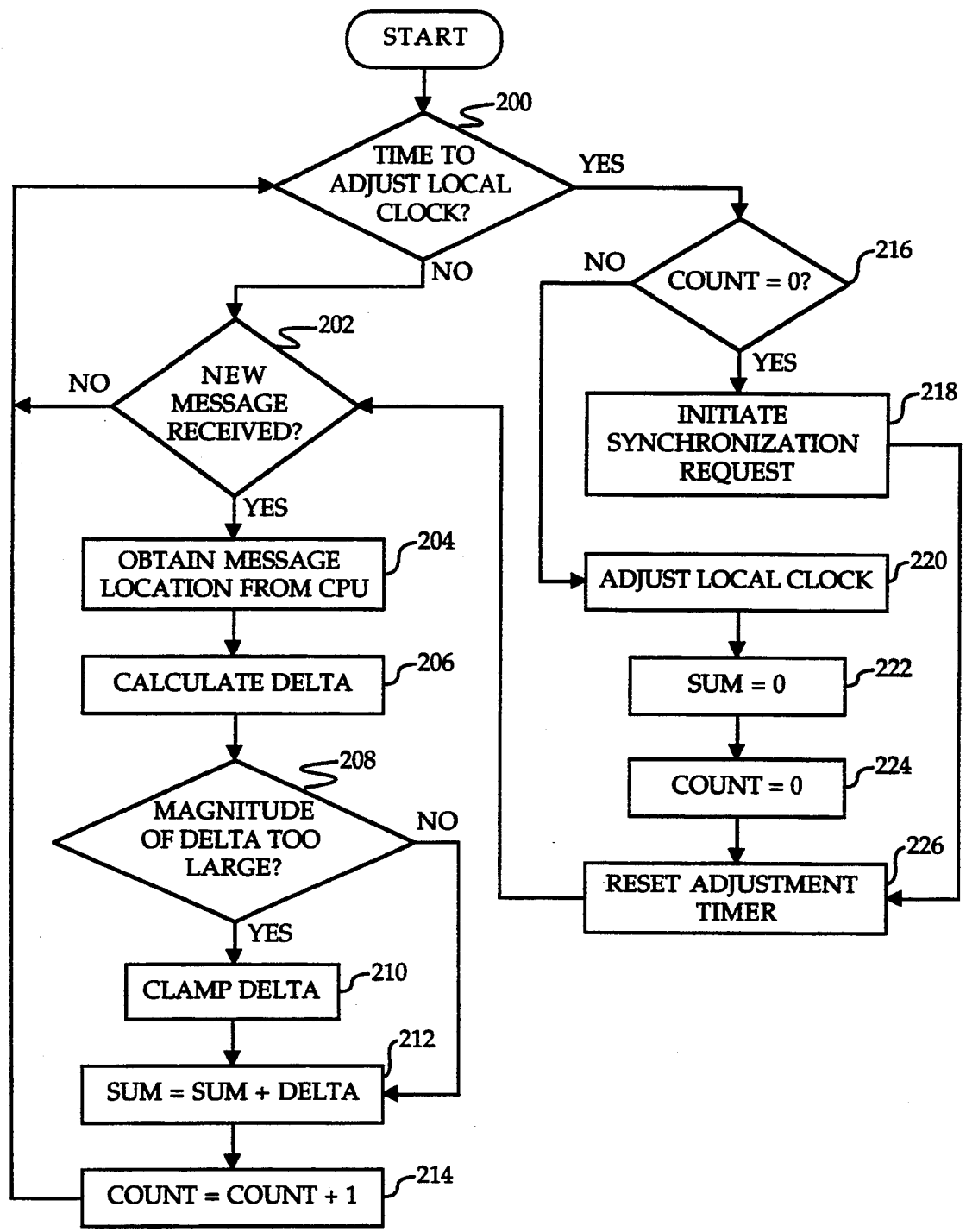
FIG. 9 is a flowchart representing the preferred method for virtual master clock processor operation.

After a message has been received, the virtual master clock processor 54 calculates the time difference between the receiving node's local clock value and the transmitting node's local clock value. FIG. 9 shows the preferred method of virtual master clock processor 54 operation. Beginning in step 200, the virtual master clock processor 54 determines if it is time to adjust the local clock 52 by checking the adjustment timer. The adjustment timer maintains a time count which begins counting immediately after a frequency hop and indicates when the midpoint of the dwell time has been reached. If local clock 52 adjustment is not yet required, the virtual master clock processor ascertains whether a new message has been received in step 202 via a CPU 34 inquiry. No new message receipt causes operation to return to step 200, with the virtual master clock processor 54 determining if the local clock adjustment time has arrived.

If the CPU 34 indicates that a new message has been received in step 202, the virtual master clock processor 54 obtains the message's address in RAM 36 from the CPU 34 in step 204. In step 206, the virtual master clock processor: 54 calculates the time difference between the value contained within the time stamp portion 66 of the message and the local clock value which the CPU 34 stored immediately after the message was received. In order to account for varying message lengths, the transmission time and message storage time is also included in this calculation. This time difference, herein referred to as delta, is calculated as delta=$T_{out}+T_{xmit}-T_{in}$, where $T_{out}$ is the value contained within the time stamp portion 66 of the message, corresponding to the sending node's local clock value immediately prior to message transmission; $T_{xmit}$ is the time interval required for message transmission and storage in RAM 36; and $T_{in}$ is the local clock value of the receiving node that the CPU 34 stored immediately after message reception. In step 208, the virtual master clock processor 54 determines if the value of delta exceeds a predetermined limit. This limit is preferably equal to one-half the desired synchronization accuracy, that being 5 ms in the preferred embodiment. The value of delta is maintained within a predetermined range in the event that a sending node's local clock 52 is malfunctioning or is significantly out of synchronization. This ensures that the receiving node's local clock value maintains synchronization to the virtual master clock within a known maximum limit, and is not over adjusted due to an unacceptable value for $T_{out}$. If the magnitude of delta is too large, it is clamped to the maximum allowable value in step 210. An example of the clamp value is 5 ms. Next, the current value of delta is added to a running total SUM of all previously calculated delta values in step 212, after which the virtual master clock processor 54 increments a message counter, COUNT, which corresponds to the number of messages received in step 214. Operation then returns to step 200 with the virtual master clock processor 54 determining if the local clock 52 adjustment time has arrived.

If it was determined in step 200 that the local clock 52 adjustment time has arrived in step 200, the virtual master clock processor 54 next checks the value of the message counter in step 216. If the message count equals zero, no messages have been received since the last local clock 52 adjustment, and therefore no time synchronization information has been received. In this case, the virtual master clock processor initiates a synchronization request message via the CPU 34 in step 218. The CPU 34 prepares the synchronization request message, and sends it as detailed in FIG. 6. Upon receiving the synchronization request message, other nodes 22 transmit a response message over the network 20, providing the node 22 which initiated the synchronization request with messages containing time synchronization information. After initiating the synchronization request message, the virtual master clock processor 54 resets the adjustment timer in step 226. Operation then returns to step 202, with the virtual master clock processor 54 checking if any new messages have arrived.

A non zero message count in step 216 indicates messages have been received and timing information has been processed since the last local clock 52 adjustment, and causes the virtual master clock processor to adjust the local clock 52 in step 220. The virtual master clock processor 54 makes this adjustment by dividing the sum of delta values by the message counter value, and adding the resulting quantity to the to the local clock value. In step 222, the virtual master clock processor resets the SUM to zero, and in step 224 resets the message COUNT to zero. Next, in step 226, the virtual master clock processor 54 resets the adjustment timer, after which operation loops to step 202 with the check for new message arrival.

The calculation and summation of all delta values obtained from each message received, when included with the message counter, provide a virtual master clock value which the virtual master clock processor 54 uses to adjust the local clock 52. The synchronization of each node 22 to the virtual master clock ensures synchronization to between the nodes 22 within a wireless LAN group. Therefore, the need to communicate with a specific node 22 for synchronization purposes is eliminated. The present invention automatically and continuously synchronizes the local clocks 52 of the nodes 22 within a LAN group by adjusting them relative to a virtual master clock.

While the present invention has been described with reference to certain preferred embodiments, those skilled in the art will recognize that various modifications may be provided. For example, modifications might include, but would not be limited to, weighting time synchronization information based upon the transmission delay between nodes, or including a node's local clock value into the virtual master clock value prior to local clock adjustment. These and other variations upon and modifications to the preferred embodiment are provided for by the present invention which is limited only by the following claims.

What is claimed is:

1. A distributed time synchronization system for a wireless communications network having a plurality of node systems, each node system comprising:
   a display device for displaying information to the user, the display device having an input;
   an input device for inputting information to the system, the input device having an output;
   a local clock having an input and an output for providing a timing signal, the input of the local clock for receiving a signal to adjust the local clock;
   a transmitter/receiver for receiving and translating radio signals into digital signals and for translating and transmitting digital signals into radio signals in response to digital control signals, the transmitter/receiver coupled to an antenna to receive and transmit radio signals, the transmitter/receiver having an input and an output for processing digital signals;
   a virtual master clock processing means for calculating the value of a virtual master clock for the node system, the virtual master clock processing means coupled to the transmitter/receiver, the virtual master clock processing means extracting time synchronization information from each message received over the network during a predetermined time interval and using the synchronization information extracted from each message received to calculate the value of the virtual master clock;
   a processing unit for adding synchronization information to each message sent by the transmitter/receiver, and for using the value of the virtual master clock to adjust the local clock, the processing unit having inputs and outputs coupled to the input device, the display device, the local clock, the transmitter/receiver and the virtual master clock processing means; and
   a memory for storing data and routines, the memory having inputs and outputs, the memory including a first memory area storing a routine for sending messages with time synchronization information, a second memory area storing a routine for receiving messages and storing a local clock value corresponding to each message received, and a third memory area storing a routine for adjusting the local clock using extracted synchronization information, the first and second memory areas coupled to the transmitter/receiver and the processing unit, and the third memory area coupled to the local clock and the virtual master clock processing means.

2. The system of claim 1, wherein the transmitter/receiver further comprises:
   a receiver for receiving radio signals and converting them to digital signals, the receiver having an input and an output, the input coupled to the antenna;
   a transmitter for receiving digital signals and converting them to radio signals, the transmitter having an input and an output, the output coupled to the antenna; and
   a buffer for storing data, the buffer coupled to the receiver and the transmitter for storing digital signals from each, the buffer having inputs and outputs, an output of the buffer coupled to the input of the transmitter, and an input of the buffer coupled to the output of the receiver, the inputs and outputs of the buffer also coupled to the processing unit.

3. The system of claim 1, wherein the virtual master clock processing means further comprises:
   an adjustment timer for maintaining a time count indicating when the local clock is to be adjusted and when frequency hopping occurs;
   a plurality of buffers; and
   control circuitry.

4. The system of claim 1, wherein each message includes a value of the local clock of a sending node system when the message is transmitted, and the virtual master clock processing means determines the value of the virtual master clock by calculating the difference between the value of the local clock when the message is received and the value stored in the received message for each message received within the predetermined time interval, and averaging the calculated differences.

5. A computer implemented method for synchronizing a plurality of node computer systems in a communications network, the node computer systems being coupled by a media, each node computer system having a local clock, the method comprising the steps of:
   storing time synchronization information as part of a first message at a first node computer system;
   sending the first message over the network using the first node computer system;
   storing time synchronization information as part of a second message at a second node computer system;
   sending the second message over the network using the second node computer system;
   receiving the first message at a third node computer system in the communications network;
   extracting the time synchronization information from the first message at the third node computer system;
   receiving the second message at the third node computer system in the communications network;
   extracting the time synchronization information from the second message at the third node computer system; and
   adjusting the local clock of the third node computer system using the time synchronization information extracted from both the first and second messages.

6. The method of claim 5, further comprising the step of monitoring the availability of the media used by the network for communication using the first node computer system before the step of sending the first message.

7. The method of claim 5, wherein the time synchronization information is stored in the first message just prior to the step of sending the first message and the time synchronization information stored in the first message comprises the value of the local clock of the first node computer system just prior to the sending step.

8. The method of claim 5, further comprising the steps of:
   storing a local clock value for the second node computer system at the time the first message is received; and
   wherein the step of adjusting the local clock value for the second node computer system includes a comparison of the local clock value of the storing step to the time synchronization information extracted from the first message.

9. The method of claim 5, further comprising the steps of:

receiving the second message at the first node computer system;

extracting the time synchronization information from the second message at the first node computer system;

receiving the first message at the second node computer system;

extracting the time synchronization information from the first message at the second node computer system;

adjusting the local clock of the first node computer system using the time synchronization information extracted from the second message; and adjusting the local clock of the second node computer system using the time synchronization information extracted from the first message.

10. A computer implemented method for receiving messages and synchronizing a first node computer system in a communications network having a plurality of node computer systems being coupled by a media, the first node computer system having a local clock and a memory, the method comprising the steps of:

monitoring the media for a message;

determining whether a message was detected on the media;

returning to the monitoring step if a message was not detected on the media;

transferring the incoming message from a transmitter/receiver of the first node computer system to the memory of the first node computer system;

storing the value of a local clock of the first node computer system at the time the message is received in memory of the first node computer system;

extracting time synchronization information from each message received at the first node computer system; and adjusting the local clock of the first node computer system using the time synchronization information extracted from each message received.

11. The method of claim 10, further comprising before the adjusting step the steps of:

determining whether it is time to adjust the local clock of the first node computer system; and processing and waiting for messages if it is not time to adjust the local clock of the first node computer system.

12. The method of claim 11, wherein the network is a wireless frequency hopping spread spectrum network, and the step of determining whether it is time to adjust the local clock of the first node computer system is performed by measuring whether one-half of a dwell time has elapsed since a most-recent frequency hop.

13. The method of claim 11, wherein the step of processing and waiting for messages further comprises the steps of:

determining whether a new message has been received;

returning to the step of determining whether it is time to adjust the local clock, if no new message has been received;

obtaining the new message from memory if a new message has been received;

obtaining time of receipt information from memory, the time of receipt information corresponding to the new message;

calculating the difference between the time synchronization information extracted from the new message and the time of receipt information obtained; and maintaining an average time difference.

14. The method of claim 13, the step of processing and waiting for messages further comprises the steps of:

comparing the difference between the time synchronization information and the time of receipt information obtained to a clamping value; and using the clamping value instead of the difference between the time synchronization information and the time of receipt information obtained for maintaining the average time difference if the difference between the time synchronization information and the time of receipt information obtained is greater than the clamping value.

15. The method of claim 13, wherein the step of adjusting the local clock of the first node computer system using the time synchronization information further comprises the steps of:

determining whether any message has been received by the first node computer system;

sending an synchronization request message over the network if no message has been received by the first node computer system; and adjusting the clock using the average time difference if a message has been received.

16. A computer implemented method for joining a first node computer system to a wireless frequency hopping spread spectrum communications network having a plurality of node computer systems being coupled by a media with a plurality of logical channels, and being characterized by a network identification, the method comprising the steps of:

selecting a channel of the media with the first node;

sending a join request message on the selected channel of the media;

scanning the selected channel for any message transmitted on the selected channel;

extracting a network identification and time synchronization information from any message transmitted on the selected channel;

determine whether the extracted network identification is the same as that for the network the first node computer system is joining; and adjusting a local clock of the first node computer system using the time synchronization information from the message transmitted on the channel if the network identification corresponds to the network the first node computer system is joining.

17. The method of claim 16, wherein the steps of the method are repeated on each of the channels utilized by wireless frequency hopping spread spectrum communications network.

18. The method of claim 17, wherein the steps of sending a join request message is repeated at least once on each channel before the steps are repeated on another channel.

19. The method of claim 17, wherein each channel is scanned for a predetermined amount of time, and the method changes channels a rate ten times greater than the hopping rate of the wireless frequency hopping spread spectrum communications network.

* * * * *